United States Patent
Zwier et al.

(10) Patent No.: US 9,879,428 B2
(45) Date of Patent: Jan. 30, 2018

(54) TEMPORARY RAIN WATER COLLECTION ASSEMBLY FOR USE ON A ROOF OF A BUILDING

(71) Applicants: Daniel G. Zwier, Holland, MI (US); Robert D. Anderson, Grandville, MI (US); Philip L. Koops, Saugatuck, MI (US); Dennis C. Herdegen, Holland, MI (US)

(72) Inventors: Daniel G. Zwier, Holland, MI (US); Robert D. Anderson, Grandville, MI (US); Philip L. Koops, Saugatuck, MI (US); Dennis C. Herdegen, Holland, MI (US)

(73) Assignee: Permaloc Corporation, Holland, MI (US)

( * ) Notice: Subject to any disclaimer, the term of this patent is extended or adjusted under 35 U.S.C. 154(b) by 79 days.

(21) Appl. No.: 14/877,427

(22) Filed: Oct. 7, 2015

(65) Prior Publication Data
US 2016/0108621 A1 Apr. 21, 2016

Related U.S. Application Data

(60) Provisional application No. 62/066,620, filed on Oct. 21, 2014.

(51) Int. Cl.
*E04D 13/04* (2006.01)
*E04D 11/00* (2006.01)
(Continued)

(52) U.S. Cl.
CPC ......... *E04D 13/0404* (2013.01); *A01G 1/007* (2013.01); *E03B 3/03* (2013.01);
(Continued)

(58) Field of Classification Search
CPC .... E04D 11/002; E04D 13/0404; A01G 1/007
See application file for complete search history.

(56) References Cited

U.S. PATENT DOCUMENTS 6,161,362 A 12/2000 Forbis, Sr. et al.
7,603,808 B2 * 10/2009 Carpenter ................ A01G 9/02
47/65.5

(Continued)

FOREIGN PATENT DOCUMENTS

WO WO 2012/032391 A1 3/2012

OTHER PUBLICATIONS

Patent Abstracts of Japan for JP 05-284851 dated Nov. 2, 1993 English Abstract and Drawings (2 pages).
(Continued)

*Primary Examiner* — Kevin Murphy
(74) *Attorney, Agent, or Firm* — Flynn, Thiel, Boutell & Tanis, P.C.

(57) ABSTRACT

A rain water collection system for a blue roof system that includes a tray assembly comprising a container, a water absorbing layer located in said interior region of the container, ballast members and a cover plate. The water absorbing layer is supported on a first set of support surfaces to locate the water absorbing layer above the bottom wall of the container to provide a water collecting space into which will flow excess water that exceeds the water absorbing capacity of the water absorbing layer. The sidewalls of the container have openings therethrough to facilitate the passage of over flow water from the container and the introduction of air therethrough into the interior region. The upstanding columns have openings to facilitate the passage of air therethrough into the interior region of the container.

19 Claims, 15 Drawing Sheets

(51) Int. Cl.
*A01G 1/00* (2006.01)
*E03B 3/03* (2006.01)
*E03F 1/00* (2006.01)

(52) U.S. Cl.
CPC ............ *E03F 1/005* (2013.01); *E04D 11/002* (2013.01); *Y02B 80/32* (2013.01)

(56) References Cited

U.S. PATENT DOCUMENTS

| | | | |
|---|---|---|---|
| 8,122,682 B2 * | 2/2012 | Mischo | E04D 7/005 47/66.1 |
| 2011/0289839 A1 * | 12/2011 | Cronk | A01G 9/025 47/65.7 |
| 2011/0290341 A1 | 12/2011 | Lame et al. | |
| 2014/0026480 A1 | 1/2014 | Lenhart, Jr. et al. | |

OTHER PUBLICATIONS

Patent Abstracts of Japan for JP 10-164989 dated Jun. 23, 1998 English Abstract and Drawings (3 pages).
Patent Abstracts of Japan for JP 11-075561 dated Mar. 23, 1999 English Abstract and Drawings (5 pages).
Patent Abstracts of Japan for JP 2000-102324 dated Apr. 11, 2000—English Abstract and Drawings (4 pages).
Patent Abstracts of Japan for JP 2000-342076 dated Dec. 12, 2000—English Abstract and Drawings (4 pages).
Patent Abstracts of Japan for JP 2004-041095 dated Feb. 12, 2004—English Abstract and Drawings (4 pages).
Patent Abstracts of Japan for JP 2005-013026 dated Jan. 20, 2005—English Abstract and Drawings (2 pages).
Machine Translation for CN 203201033 U dated Sep. 18, 2013 (3 pages).

* cited by examiner

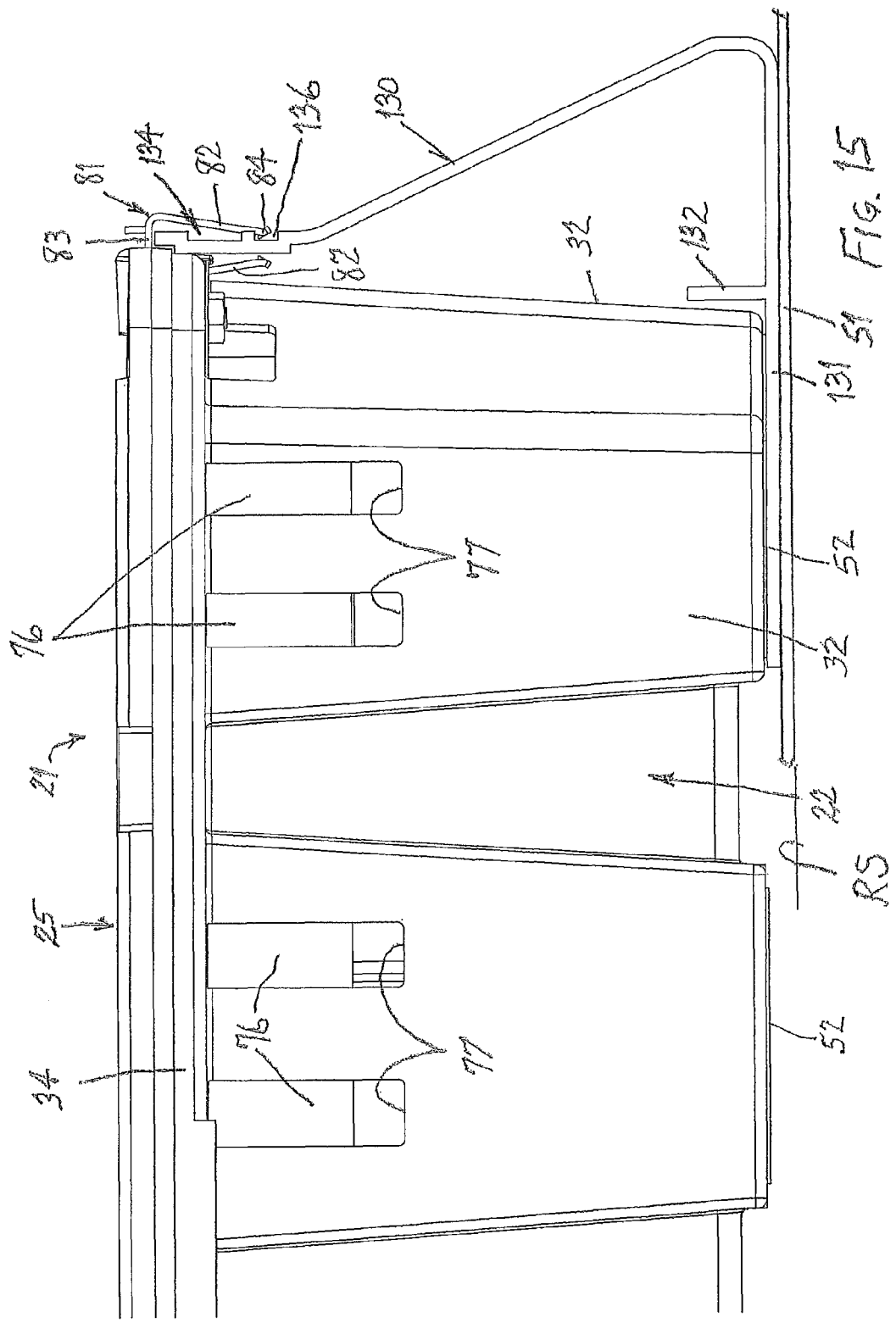

TEMPORARY RAIN WATER COLLECTION ASSEMBLY FOR USE ON A ROOF OF A BUILDING

CROSS REFERENCE TO RELATED APPLICATION

This claims the benefit of U.S. Provisional Application No. 62/066,620, filed Oct. 21, 2014, which is hereby incorporated by reference in its entirety.

FIELD OF THE INVENTION

This invention relates to a rain water collection system for a blue roof system.

BACKGROUND OF THE INVENTION

Urban storm water is rain that falls over urban and suburban areas, or any place with a large percent cover of impervious surfaces such as roads, parking lots, and roofs. The management of this water is of increasing critical interest for developers, designers, and municipalities that are facing increasing ecological and political pressure to maintain pre-development site hydrology. This has been recognized in Lenhart US published patent application no. 2014/0026480 A1, published on Jan. 30, 2014.

During the $20^{th}$ century, many of North America's major urban areas were developed with a large portion of the land area being covered by impervious surface materials such as impermeable pavements and roof membranes. This design and construction method was the standard so as to prevent water from infiltrating into and damaging infrastructure and buildings. Further, the impermeable surfaces provided a simple method for erosion control and storm water conveyance.

As these developed urban areas began to increase in population and expand into larger sub-urban areas, the amount of impermeable surfaces increased, creating a significant increase in storm water runoff. The large impermeable areas generate enormous amounts of water runoff during moderate to heavy rainfall events, far exceeding the design capacities of the existing grey conveyance systems, resulting in localized flooding, wastewater and pollution issues. Where storm water management uses only grey infrastructure, sewers transport rain or melting snow that can no longer soak into the ground, along with the pollutants the water has picked up, to the nearest body of water or to a wastewater treatment plant. Many cities have built combined sewer and storm water systems that lack the capacity to handle the increased storm water. In these circumstances, the sewer systems quite often have to release untreated sewer water into the waterways during moderate storm events. Further, recent research indicates that the percent of impervious cover in a watershed is directly related to the health of its rivers, lakes, and estuaries.

Green Infrastructure storm water management techniques generally use soil, vegetation or engineered systems to mimic natural processes to collect, cleanse and retain storm water within the watershed. Green infrastructure techniques, such as bio-retention, green and blue roof technology and underground storage in cisterns, preserve or restore the natural hydrologic cycle by infiltrating, evaporating, and harvesting rain water as close to the source as possible. These techniques use rain that falls on hard surfaces as a resource rather than treating it as a waste product. Soil, vegetation and engineered materials filter or biologically or chemically degrade many storm water pollutants that would otherwise be discharged directly into nearby water bodies by systems where only sewer pipes are used for storm water management.

In addition to reducing problems associated with grey infrastructure (sewer pipe) storm water management, green infrastructure techniques utilizing retention, storage and evaporation generally produce additional benefits, including improved air quality, mitigation of the urban heat island effect, reduced building energy costs, enhanced urban aesthetics, increased property values, and more.

Cities that have begun integrating green infrastructure into their storm water management have found it to be cost competitive with conventional storm water management, as well as more effective.

Currently, the trend for roof top green infrastructure has been to place vegetation on flat rooftops (Green Roof). The primary benefits of installing a vegetated roof are a lowering of cooling costs and energy consumption, storm water mitigation, heat reduction, and aesthetics. Although vegetated roof systems have proven to be successful on a modest scale, they are limited in their application potential. Not every roof can support the weight of a vegetated system. Further vegetated systems are limited in that an urban rooftop is a very challenging environment to grow plants. There are many challenges, such as drought, climate extremes, high winds, pollution, poor maintenance and a limited plant palate.

Accordingly, it is an object of this invention to provide a product that can provide the benefits of a vegetated roof, storm water retention pond and cool roof while being practical at the commercial level.

As further object of this invention is to provide a product that can temporarily collect and store large amounts of rainfall at the source and then slowly liberate the stored water through a combination of natural processes that will effectively eliminate storm water runoff from the vast majority of rain events and greatly reduce the impact of runoff and flooding for major storm events.

It is a still further object of this invention to provide a product that utilizes natural processes to return water vapor to the local environment while providing evaporative cooling to the local rooftop.

It is a still further object of this invention to provide a system that releases stored water that cannot be evaporated at a controlled rate providing surge relief for stressed storm water systems.

It is a still further object of this invention to provide a product that is completely scalable for flat roofs from a few square feet to millions of square feet.

It is a still further object of this invention to provide a product that is cost effective, impactful, easy to install and maintain.

It is a still further object of this invention to provide a product that protects a building's roof membrane from the sun's UV rays greatly reducing solar heat gain and extending the total life of the roof membrane.

SUMMARY OF THE INVENTION

The objects and purposes of the invention are met by providing a rain water collection system for a blue roof system which includes a tray assembly comprising a container having sidewalls, a bottom wall and an open top that defines an interior region of the container, the interior region having a plurality of upstanding columns projecting upwardly from the bottom wall, a first set of upstanding columns of the plurality of upstanding columns projecting upwardly from the bottom wall to a first elevated position within the interior region so as to promote the free movement of air and water within the interior region while upwardly facing surfaces on each of the first set of upstanding columns provides a set of coplanar first support surfaces spaced above a plane of said bottom wall, a water absorbing layer located in the interior region, the water absorbing layer being supported on the first support surfaces so that an upwardly facing surface of the water absorbing layer is exposed to the environment, the spacing of the first support surfaces above the plane of the bottom wall facilitating the provision of a water collecting space between an underside of said water absorbing layer and the bottom wall to facilitate the flow of excess water that exceeds the water absorbing capacity of the water absorbing layer into the water collecting space of the interior region that is between the underside of the water absorbing layer and the bottom wall, and the plural sidewalls of the container having plural openings therethrough to facilitate the passage of air and over flow water therethrough, the air flowing into and around the plurality of upstanding columns, the water absorbing layer, and the water collecting space to enhance the evaporation of water from the water absorbing layer and the water collecting space.

BRIEF DESCRIPTION OF THE DRAWINGS

Other objects and purposes of the invention will be apparent to persons acquainted with apparatus of this general type upon reading the following specification and inspecting the accompanying drawings, in which:

FIG. 15 is a side elevational view of a container and a wind deflector.

DETAILED DESCRIPTION

Figure 1:
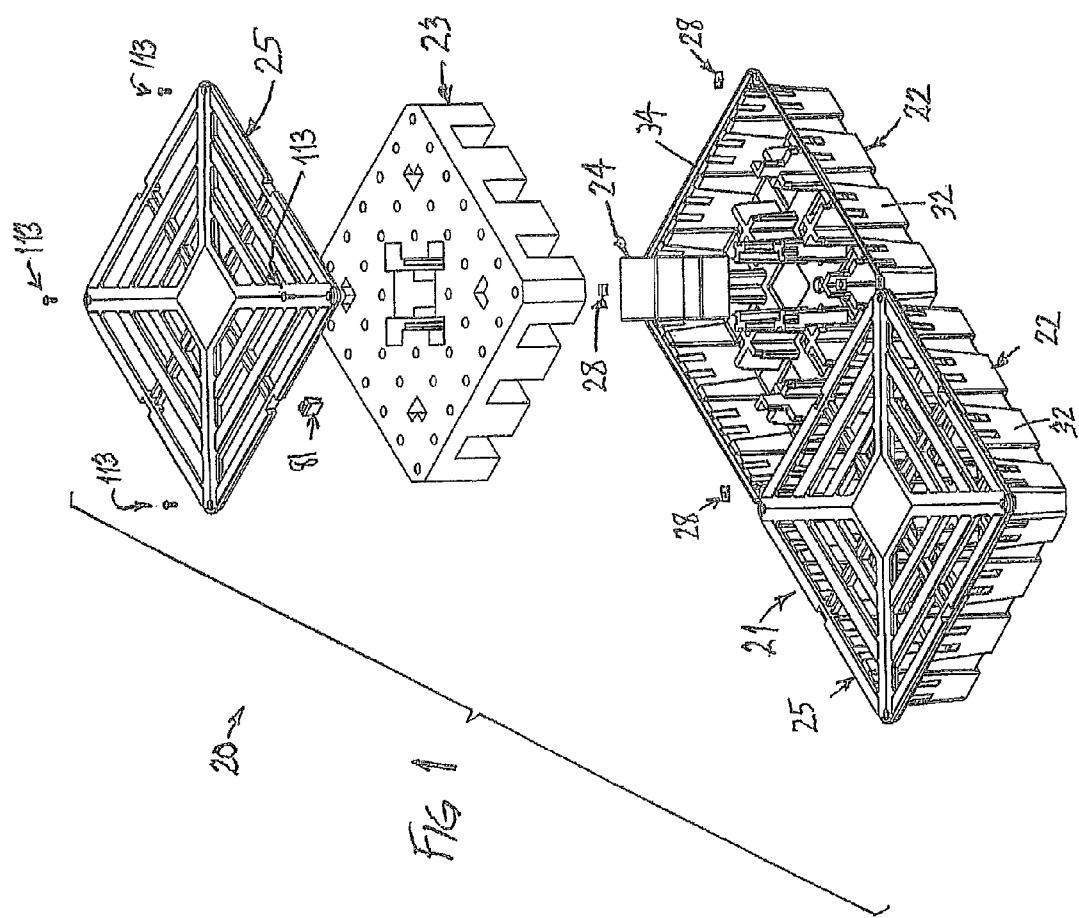
FIG. 1 illustrates a front, top and left side isometric view of a rain water collection system for a blue roof system embodying our invention.

FIG. 1 illustrated a rain water collection system 20 and includes a plurality of individual tray assemblies 21 that are interconnected to one another as will be explained in more detail below. Each tray assembly 21 has a container 22, an absorbing layer 23, ballast assemblage 24 and a cover plate assembly 25.

Figure 2:
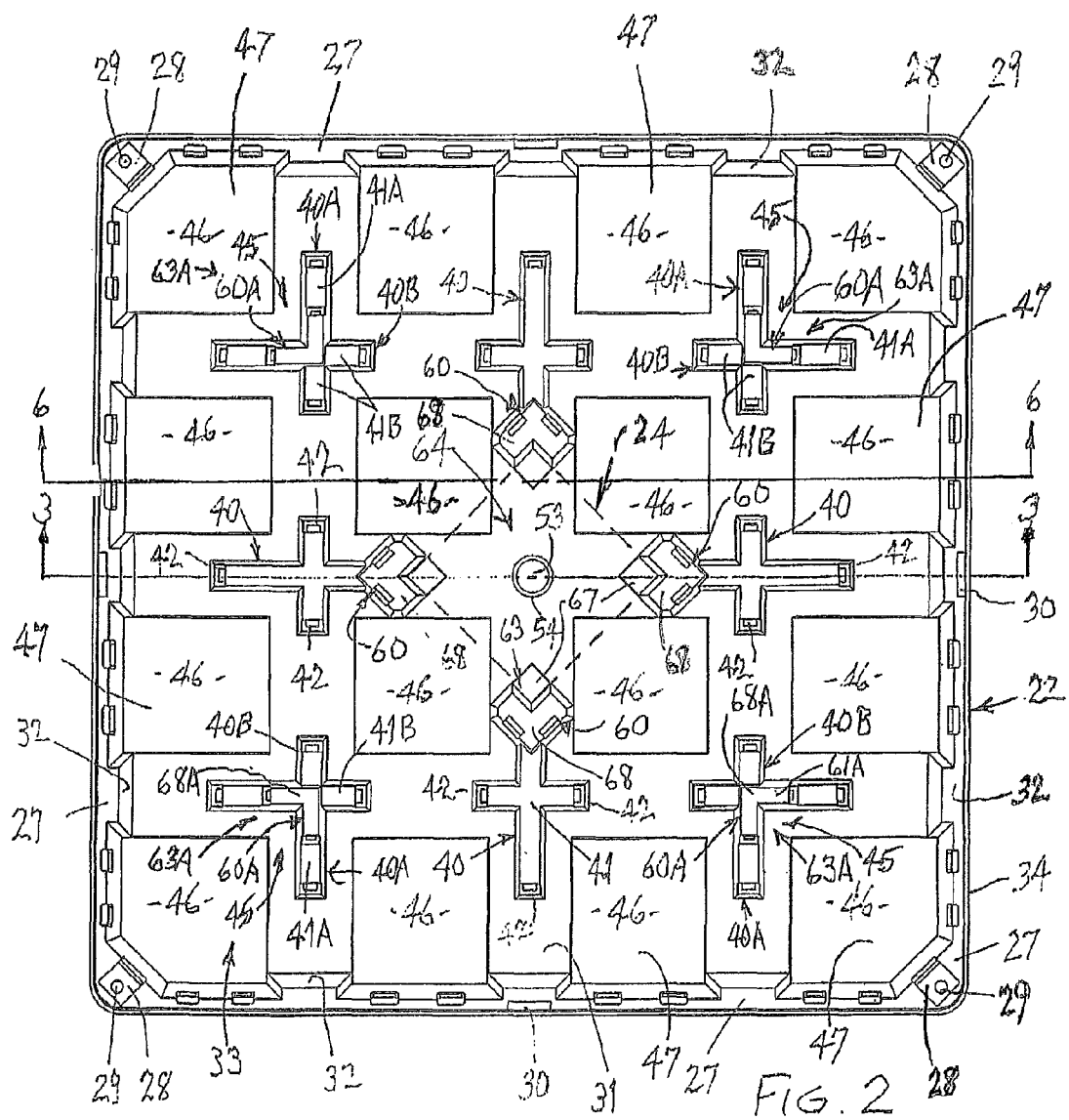
FIG. 2 is a top view of a container provided in the rain water collection system.

The container 22 (FIGS. 2 and 3) is formed from a suitable thermoplastic resin based material, such as ABS, Polyethylene, Polypropylene. metal or wood and includes a bottom wall 31 and a plurality of upstanding sidewalls 32 that are integral with the bottom wall 31 and with each other. In this particular embodiment, the container is rectangular or square as shown in the top view of FIG. 2 and includes four upstanding sidewalls 32 to define an interior region 33 of the container 22. Each of the sidewalls 32 are inclined to the vertical and terminate at an upper horizontally flat surface 27 that is oriented in a plane that is parallel to a plane containing the floor of the bottom wall 31 and, at an outer peripheral edge thereof, a vertically upstanding wall or rim 34. The surface 27 also extends between the corners as shown in FIG. 2. A screw receiving hole (not shown) is provided on the surface 27 in each corner of the container adjacent the rim 34. If desired, a slot 26 (FIG. 14) can be provided in the sidewalls 32 adjacent each corner and configured to hold in place a metal clip 28 with a screw receiving hole 29 in it that becomes aligned with the screw receiving hole in the surface 27. A through rectangular hole 30 is provided in the surfaces 27 about midway of each sidewall 22.

A plurality of individual upstanding and hollow columns 40 are provided on the bottom wall 31 and are integral therewith. In this particular embodiment, the individual columns 40 are laterally spaced from one another to allow air and water in the interior region 33 of the container to move freely about unobstructed by the individual columns 40. While each column can be of any cross sectional shape, in this particular embodiment, each column 40 closest to the geometric center of the bottom wall 31 is generally X-shaped and terminates at an upper end in an X-shaped flat surface 41 that is parallel with the floor of the bottom wall 31 and is spaced a finite distance below the plane containing the flat surfaces 27. At least one through opening 42, here a plurality of through openings 42 are provided in the flat surface 41 and each thereof extends to the sidewalls 43 of the column 40 to facilitate the passage of air to and from the hollow interior of the columns 40 through the openings 42. A lower edge 44 (FIG. 4) of each opening 40 is located a finite distance from the plane of the floor of the bottom wall 31.

The columns 40A and 40B adjacent the four corners of the interior region 33 are generally L-shaped with the included angle 45 between the legs of the L of the columns 40A facing the corners. Like the columns 40, the columns 40A and 40B each terminate at an upper end in a flat surface 41A and 41B, here an L-shaped flat surface, that is parallel with the floor of the bottom wall 31 and is spaced a finite distance below the plane containing the surfaces 27. At least one through opening 42A and 42B, here a plurality of through openings 42A and 42B are provided in the flat surface 41A and 41B, respectively, and each thereof extends to the sidewalls 43A and 43B of the column 40A and 40B, respectively, to facilitate the passage of air to and from the hollow interior of the columns 40A and 40B through the openings 42A and 42B. A lower edge 44A and 44B of each opening 40A and 40B is located a finite distance above the plane of the floor of the bottom wall 31 and in a coplanar relation to the lower edges 44 in the columns 40.

A plurality of separate pockets 46 are formed in the bottom wall 31 with each pocket having a bottom wall 47 that is located in a plane that is parallel to and oriented below the plane of the floor of the bottom wall 31. The bottom wall 47 of each of the pockets 46 forms a support surface 48 on the underside thereof, which results in the underside of the bottom wall 31 becoming elevated above a roof surface RS (FIG. 6) upon which each container 22 is placed. A spacing 49 between the underside of the bottom wall 31 and the roof surface RS will facilitate the passage of air and water therethrough.

In some instances, it is desirable to line the roof surface RS (FIGS. 4 and 6) with a roof slip sheet 51 to isolate the roof structure from the weathering effect caused by the elements of the atmosphere. The support surfaces 48 each have pads 52 secured thereto to protect the roof surface RS from wear caused by the placement of containers 22 thereon as well as protect the roof slip sheet 51 from the aforesaid wear.

A drain opening 53 is provided in the bottom wall 31 of the container 22. An upstanding flange 54 of a finite height above the floor of the bottom wall 31 encircles the drain opening 53. The drain opening 53 provides a passageway between the interior region 33 and the space 49 between the roof surface RS and the underside of the bottom wall 31.

A plurality of additional upstanding and hollow columns 60 are provided on the bottom wall 31 and integral therewith as well as being integral with selected ones of the columns 40. In this particular embodiment, there are four additional columns 60 equidistantly spaced from each other and the drain opening 53. Each additional column 60 is generally L-shaped in cross section with the length of the legs 61 of the L-shape being equal. The legs 61 each have upstanding sidewalls 62 defining an angle 63 therebetween which open toward the drain opening 53 so that the sidewalls 62 of each of the legs 61 on each of the additional columns 60 define a rectangle or a square area 64. The sidewalls 62 also each have a step feature 66 (FIGS. 4 and 5) defining a generally horizontal support surface 67 that is elevated above the upper rim of the upstanding flange 54 encircling the drain opening 53. The upstanding columns 60 each terminate at the upper end in a flat support surface 68 that is coplanar and parallel with the support surface 27. Furthermore, the support surfaces 68 are elevated above the support surfaces 41a and 41B a finite distance to be coplanar, as aforesaid, with the surfaces 27 in each of the corners of the container 22. The support surfaces 68 at the top of each leg 61 have at least one opening 69 providing a through passageway to the interior of the columns 60.

Figure 3:
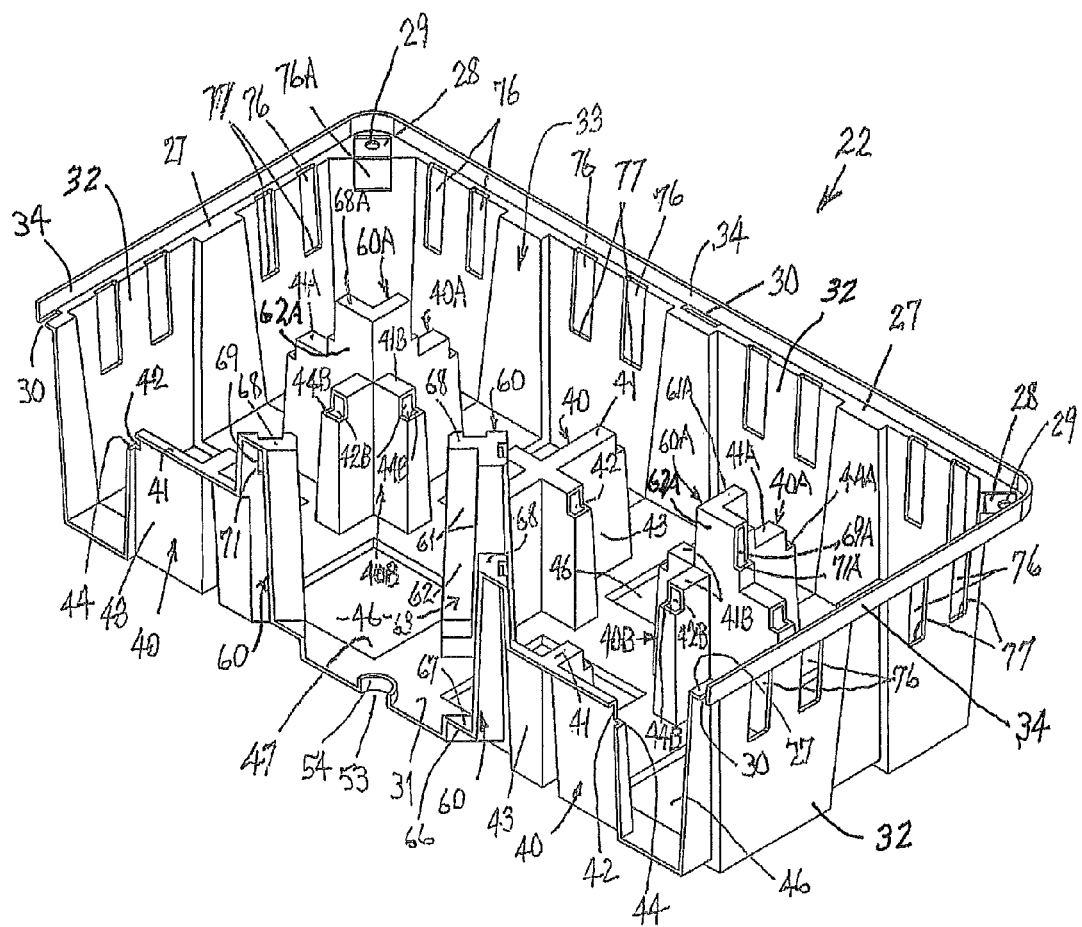
FIG. 3 is an isometric fragment of the container illustrated in FIG. 1 and illustrating the container in cross section taken along the line 3-3 in FIG. 2.
Figure 4:
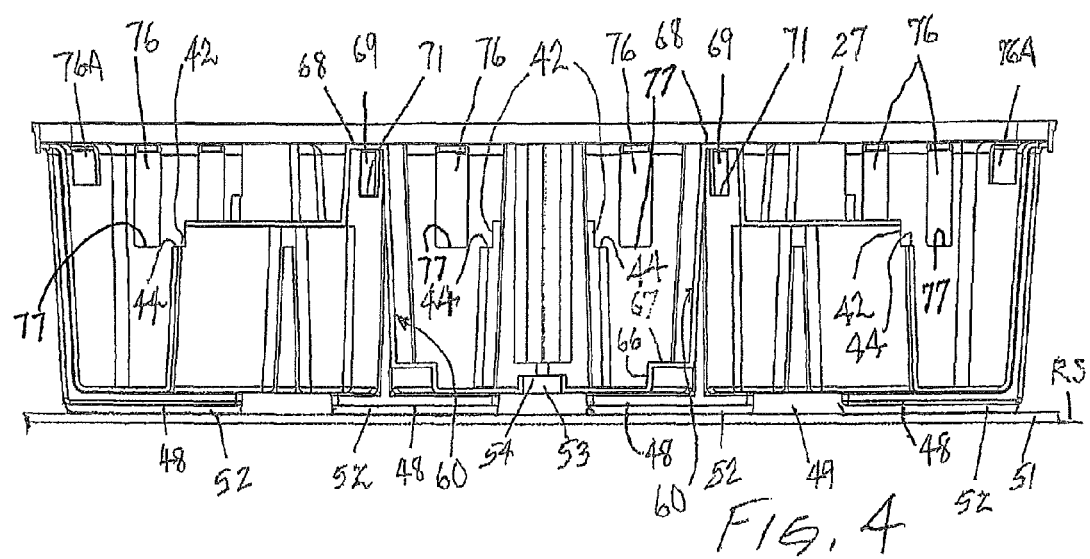
FIG. 4 is a sectional view of the container taken along the line 3-3 in FIG. 2.

Each additional column 60 is also integrally connected to the columns 40 that are equidistantly spaced from the drain opening 53 so that the columns 40 will form a buttress support for the columns 60. A lower edge 71 of each opening 69 is elevated a finite distance above the coplanar lower edges 44, 44A and 44B of the openings 42, 42A and 42B, respectively, as illustrated in FIGS. 3 and 4.

Further upstanding and hollow columns 60A are provided on the bottom wall 31 and integral therewith as well as being integral with columns 40A and 40B in each of the four corners of the interior region 33 of the container 22. In this particular embodiment, there are a total of four further columns 60A equidistantly spaced from each other and the drain opening 53. Each further column 60A is generally L-shaped in cross section with the length of the legs 61A of the L-shape being equal. The legs 61A each have upstanding sidewalls 62A defining an angle 63A therebetween which open toward the respective corner of the container 22. The upstanding columns 60A each terminate at the upper end in a flat support surface 68A that is coplanar and parallel with the support surface 27. Furthermore, the support surfaces 68A are elevated above the support surfaces 41, 41A and 41B a finite distance to be coplanar, as aforesaid, with the surfaces 27 in each of the corners of the container. The support surfaces 60A at the top of each leg 61A have at least one opening 69A providing a through passageway to the interior of the columns 60A. A lower edge 71A of each opening 69A is elevated a finite distance above the coplanar lower edges 44, 44A and 44B of the openings 42, 42A and 42B, respectively, as illustrated in FIGS. 3 and 4.

Each additional column 60A is also integrally connected to the columns 40A and 40B so that the columns 40A and 40B, straddling the respective column 60A, will form a buttress support for the further columns 60A.

Figure 14:
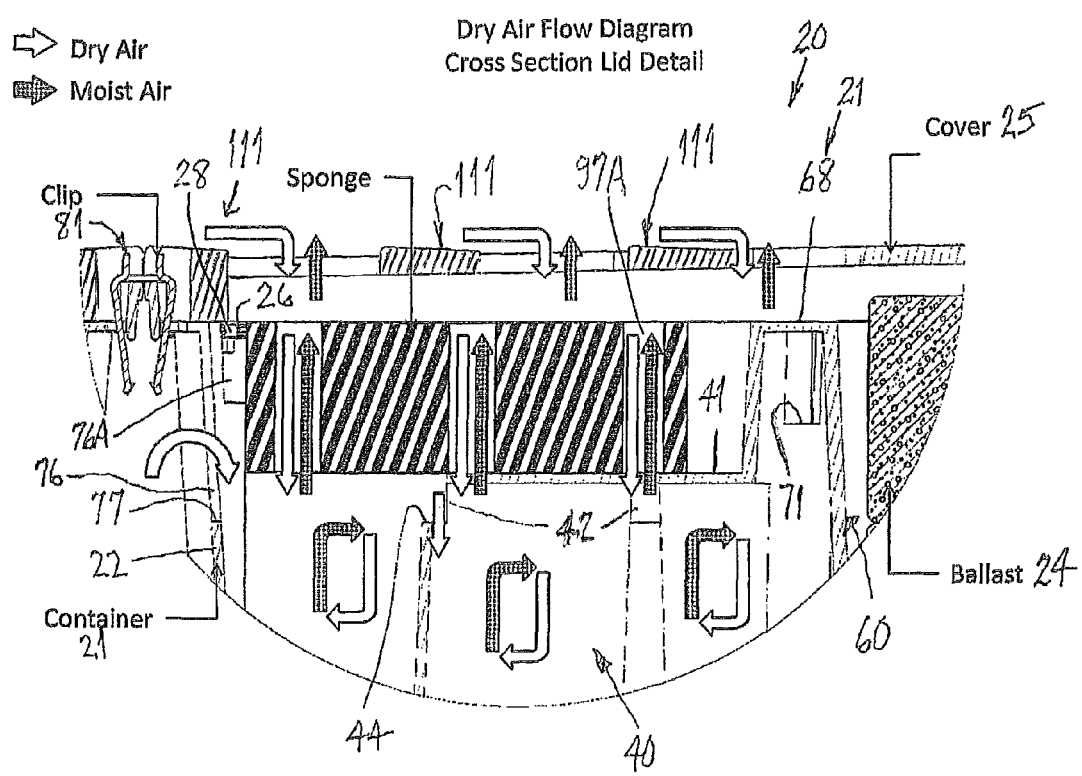
FIG. 14 is an enlarged sectional view taken along a partial length of the section line 3-3 in FIG. 2 to show an air flow pattern throughout the internal region of the container and the absorbing layer.

Each sidewall 32 of the container 22 has a plurality of laterally spaced side through openings 76 to provide plural passageways between the interior region 33 of the container and the exterior thereof through the openings 76 in the sidewalls 32. In this particular embodiment, each of the openings 76 is of the same cross sectional area and has lower edges 77 that are oriented in a plane that is parallel to and below the plane containing the flat surfaces 27. Furthermore, the lower edge 77 of each opening 76 is coplanar with the lower edges 44, 44A and 44B of each of the openings 42, 42A and 42B in the columns 40, 40A and 40B. There is also a through opening 76A located in each corner of the container 22 as shown in FIG. 3. The lower edge of these openings is elevated above the lower edges of the openings 77, 44, 44A and 44B as shown in FIGS. 3 and 14.

Figure 7:
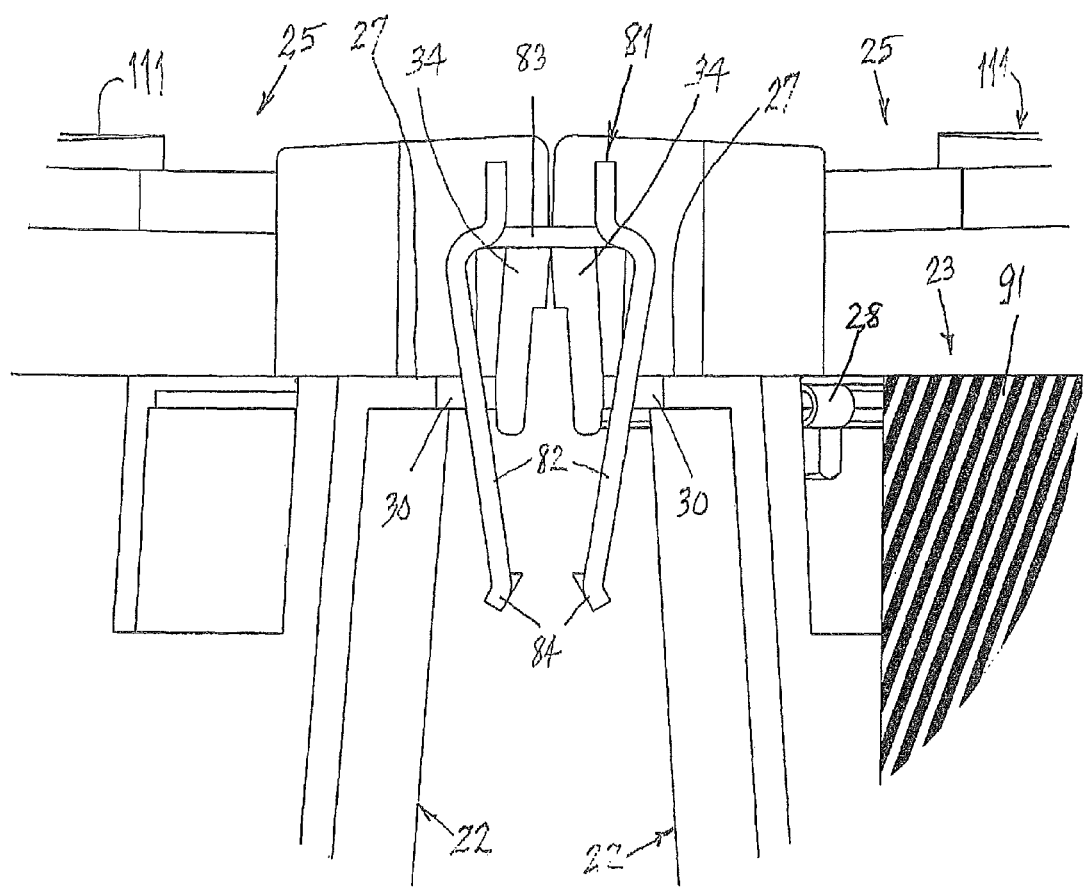
FIG. 7 is an enlarged sectional view taken along a partial length of the section line 3,4,5-3,4,5 in FIG. 2 to show a fragment of the container and a clip holding two side-by-side containers together.

Side-by-side containers 22 as shown in FIG. 1 are held together by an inverted U-shaped clip mechanism 81 as shown in FIG. 7. The U-shaped clip is made of a spring metal and includes two legs 82 interconnected by a bight section 83. The lateral spacing between the distal ends 84 of the legs 82 is less than the lateral spacing of the adjacent openings 30 in the surfaces 27 of the container 22 to that the legs 82 will require a force to spread the legs 82 apart so that the distal ends 84 become aligned with the openings 30 and facilitate the insert of the legs 82 through the openings 30 and enable the bight section 83 to engage the upper edge of the rim 34, A release of the force spreading the legs 82 apart will cause the distal ends 84 to spring together to thereby hold the containers 22 in the side-by-side relation and prevent the containers from separating.

The ballast assemblage 24 includes at least one ballast block 85 and is provided to add weight to the containers 22. In this particular embodiment, the ballast assemblage includes plural individual ballast blocks 86 stacked one upon the other in the rectangular or square area 64 and lodged into the angles 63 defined by the legs 62 of each of the columns 60. Shown in FIG. 5, the stack of ballast blocks 86 rest on the support surfaces 67 at the base of the columns 60 to locate the bottom surface of the lowermost ballast block 86 slightly above the upper edge of the rim 54 encircling the drain opening 53.

Figure 5:
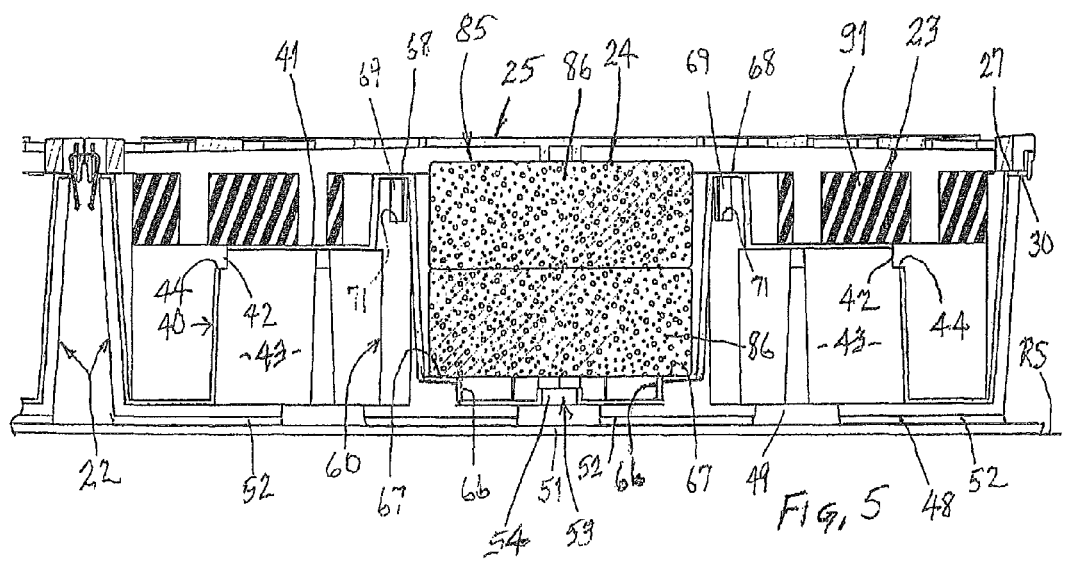
FIG. 5 is a sectional view of an assembled container taken along the line 3-3 in FIG. 2.
Figure 8:
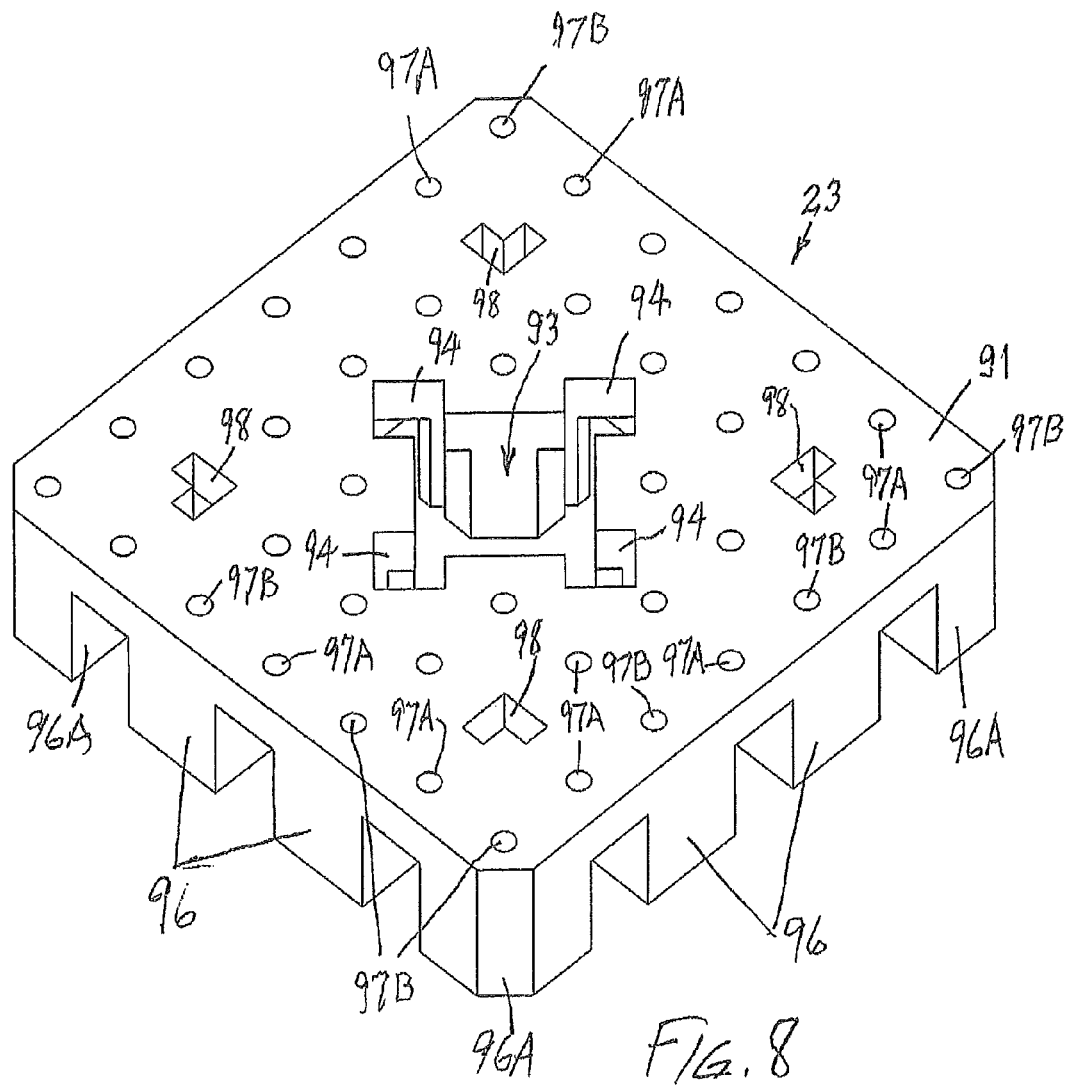
FIG. 8 is an isometric view of the absorbing layer as viewed from the top and two edges.

FIG. 8 illustrates an isometric view of a first embodiment of the absorbing layer 23 as viewed from the top and two edges. In this particular embodiment, the absorbing layer 23 is rectangular or square and thus appears the same at the four edges. The absorbing layer 23 includes a top layer 91 of uniform thickness corresponding in thickness to a dimension approximately equal to the vertical spacing that exists between the coplanar flat surfaces 41, 41A and 41B at the upper ends of the columns 40, 40A and 40B, respectively and the surfaces 27 just inside the rim 34 of the container 22 as shown in FIG. 5.

A centrally located opening 93 provided in the top layer 91 and the opening is located directly above the central region 64 of the container 22 and is of the same size or slightly larger than the size of the central region 64 in the container 22 and preferably slightly larger than the ballast blocks 86 so that the ballast blocks will be accessible through the opening 93. The opening 93 also expands into four L-shaped cutout openings 94 that are contiguous with the central opening 93 so as to facilitate the upper ends of the columns 60 to be received therethrough to locate the upper flat surfaces 68 thereon in approximately the same plane as the upper surface of the top layer 91 of the absorbing layer 23 as shown in FIG. 5.

Figure 6:
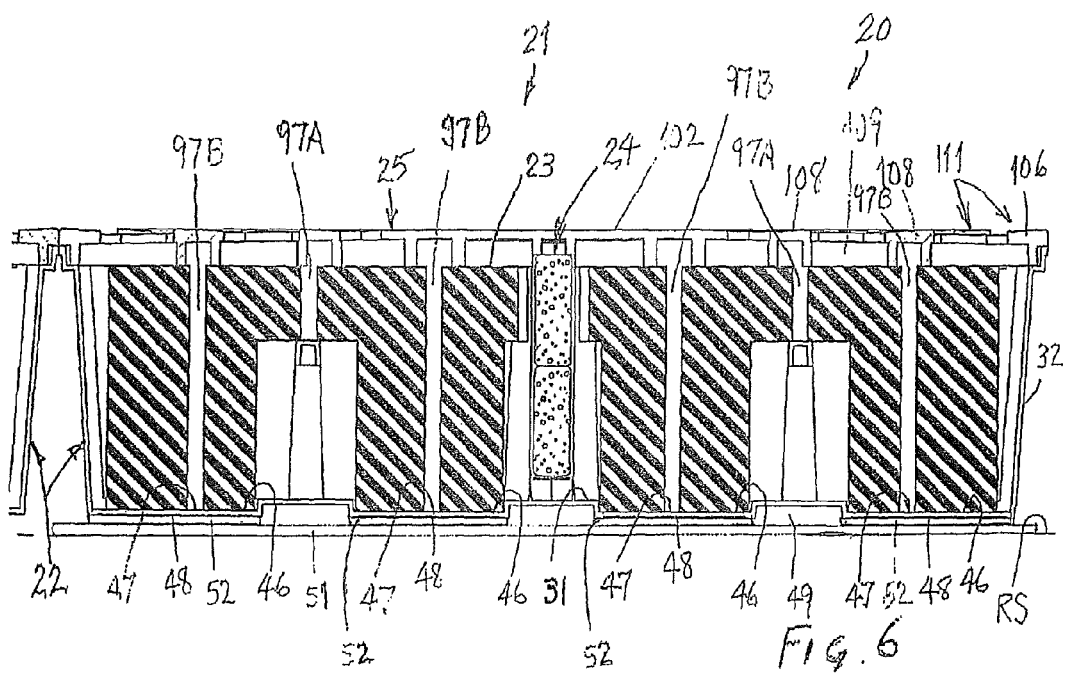
FIG. 6 is a sectional view of an assembled container taken along the line 6-6 in FIG. 2.
Figure 9:
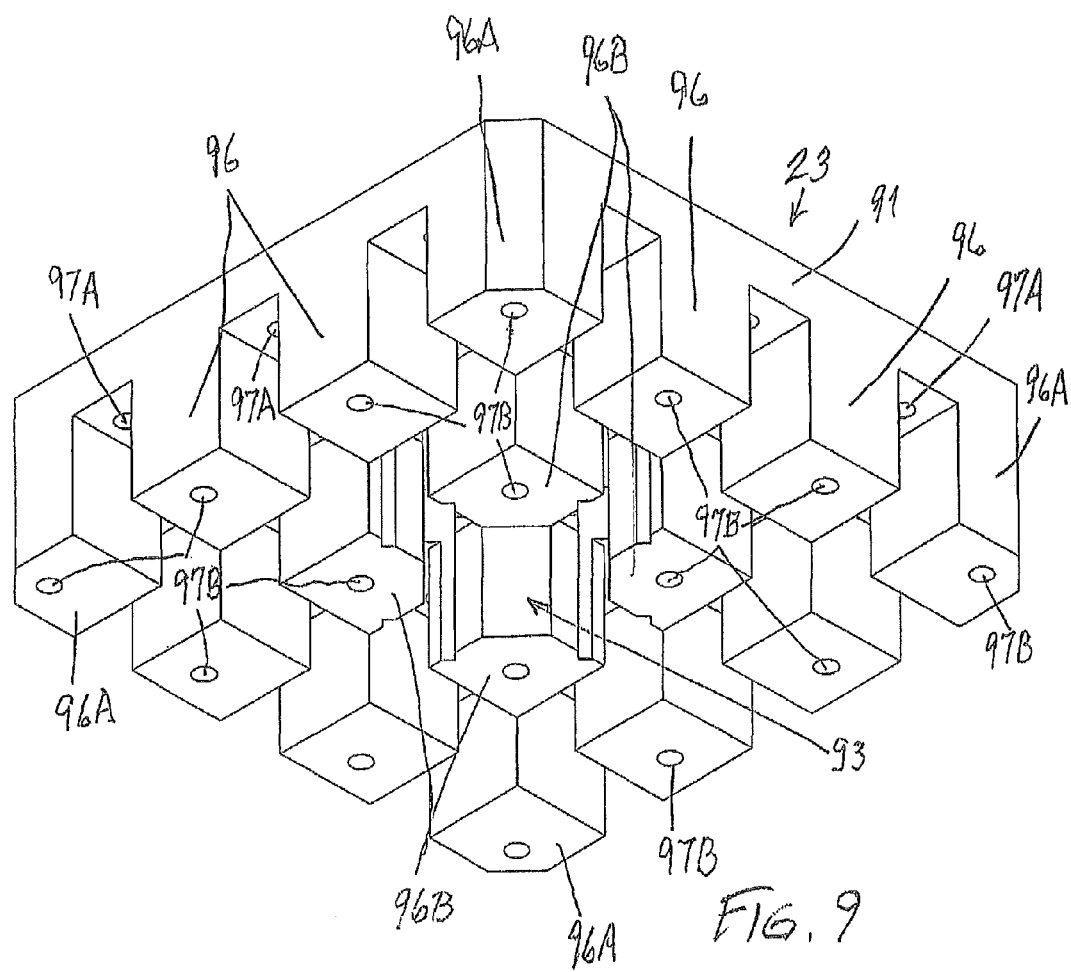
FIG. 9 is an isometric view of the absorbing layer as viewed from the bottom and two edges.

The underside of the top layer 91 is, as shown in FIG. 9, provided with a plurality of individual columns 96 integral with the top layer 91 and each of which extend from the underside of the top layer 91 downwardly and into a respective pocket 46 provided in the bottom wall 31 of the container 22 and rest on the bottom wall 47 of the pockets 46 as shown in FIG. 6. Each of the columns 96 is rectangular or square in cross section and are, in this particular embodiment, equal in cross sectional area with the possible exception of the corner columns 96A and the columns 96B surrounding the central opening 93 of the absorbing layer 23 and are equidistantly spaced from the drain opening 52. The columns 96A and 96B each have a beveled corner to accommodate the beveled corners of the container 22 and the individual ballast blocks 86 located in the central region 64 of the container 22.

An additional four L-shaped cutouts 98 are provide in the top layer 91 as shown in FIG. 8. The aforesaid cutouts 98 facilitate the reception thereon of the L-shaped upper ends of the columns 60A to locate the upper flat upper surfaces 68A thereon in a plane which is approximately the same as the plane of the upper surface of the top layer 91. The absorbing layer 23 has a plurality of through holes 97A and 97B therein, the holes 97A extending through the top layer 91 and the holes 97B extending through both the top layer 91 and each column 96A and 96B.

The absorbing layer 23 is of a unitary construction and is made of a natural cellulose sponge sheet that is trimmed to the configuration shown in FIGS. 8 and 9.

Figure 10:
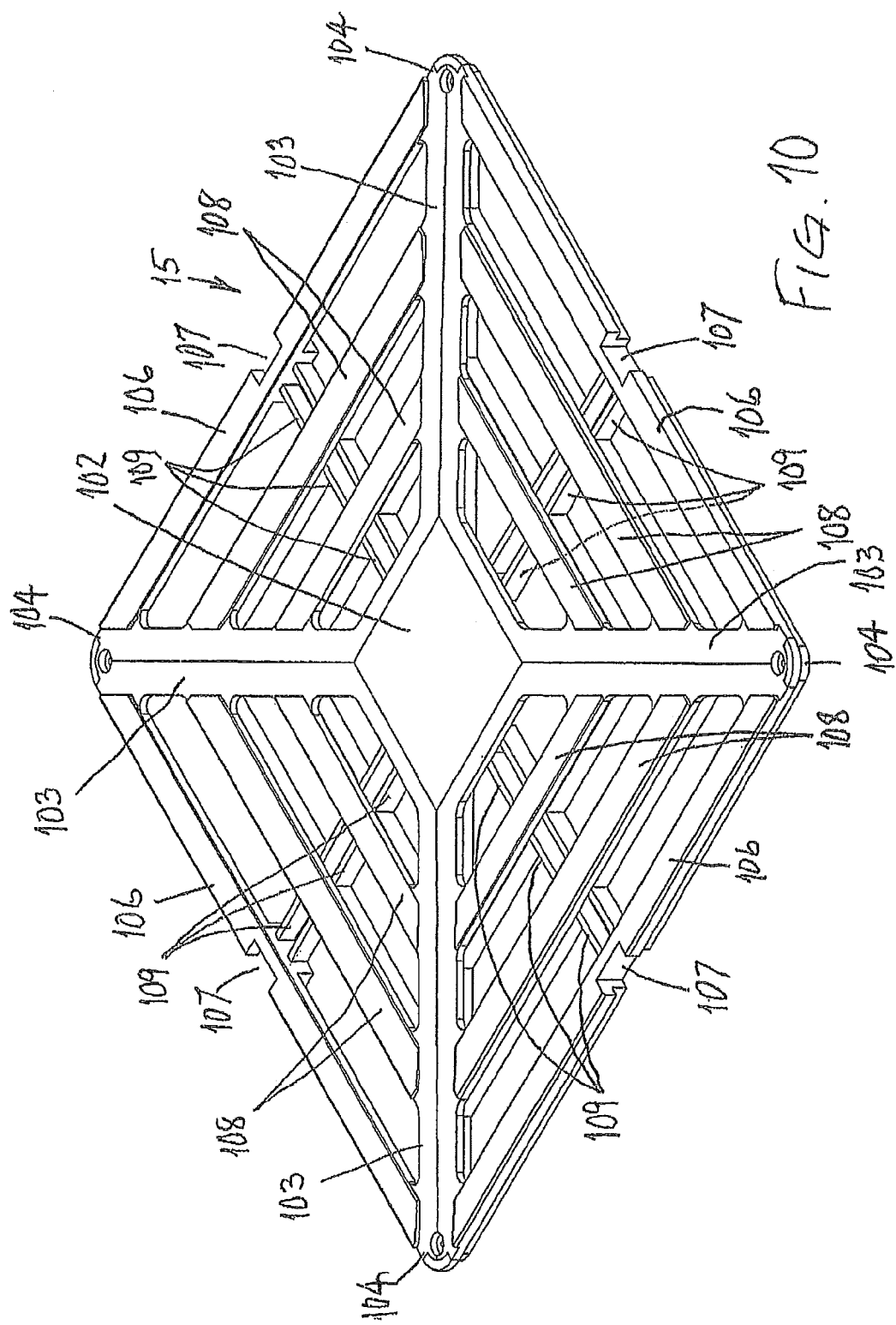
FIG. 10 is an isometric view of the cover plate illustrated in FIG. 1.
Figure 11:
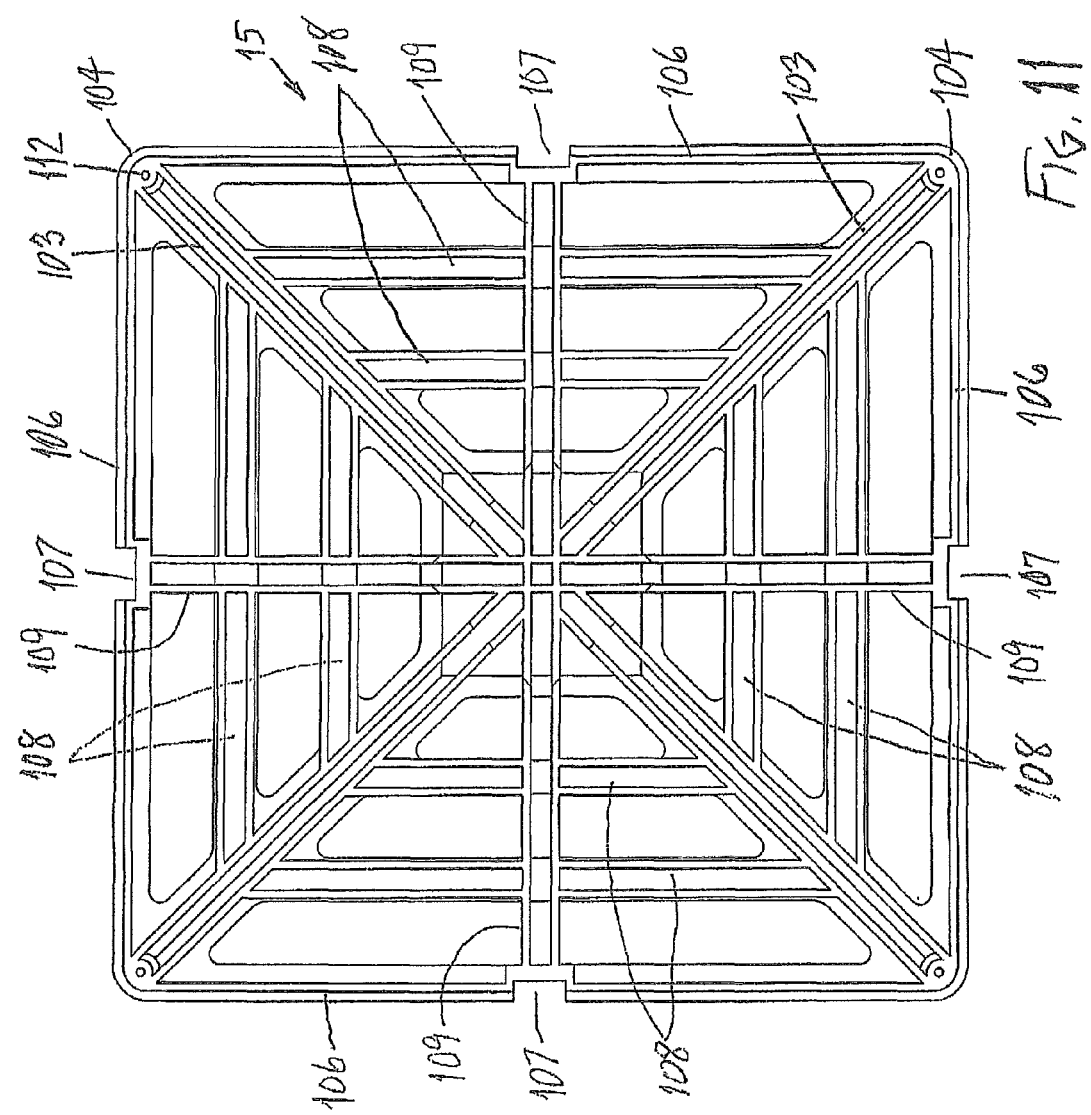
FIG. 11 is a view of the underside of the cover plate shown in FIG. 10.

The cover plate 25 illustrated in FIGS. 1, 10 and 11 is sized to fit wholly within the rim structure 34 at the top of the container sidewalls 31 of the container 22 and all four edges of the cover plate 25 rest on the surfaces 27 that are located adjacent the four sides of the rim structure 34. The cover plate 25 has a central flat plate area 102 with spoke-like ribs 103 extending radially outwardly of the central plate area 102 to each corner 104 of the plate 255. The distal ends of the spoke-like ribs 103 are interconnected at the corners 104 and by an edge member 106 that extends between the corners 104. The plural edge members 106 rest on the surfaces 27 of the container 22 and each thereof has a notch 107 located mid-length thereof. Other rib members 108 are located between the edge members 106 and the central plate area 102 and these other rib members 108 are each connected at their opposite ends to a respective spoke-like rib 103 and extend parallel to each other and to the edge members 106. The horizontal spacing between the edge members 106, and the next adjacent rib members 108 is maintained by reinforcing members 109 that are connected to and extend between the mid-length segments of thereof and as shown in FIG. 11. Each of the members 106 and 108 define a generally planar upwardly facing surface. It is preferable for the edge members 106 and the other rib members 108 to have a generally inverted U-shaped or an L-shaped cross section to reinforce the strength of the members and prevent a bending thereof out of the plane of the aforesaid upwardly facing surface when a person should walk thereon. However, it also be noted that the upwardly facing surface of each of the members 106 and 108 is inclined to the horizon as shown at 111 in FIGS. 7 and 14 to define rain water deflection surfaces.

A through hole 112 is provided in each corner 104 of the cover plate 25 and the locations thereof are designed to align with the holes 19 on the container 22. Screws 113 are received in the holes 112 and are configured to fasten to a respective metal clip 28 on the container 22 to effect a connection of the cover plate 25 to the top of the container 22. When in this condition, the underside of the cover plate 25 will rest on and be supported by the surfaces 27 and the upper surfaces 68 and 68A of the columns 60 and 60A, respectively. This support and the reinforced strength provided by the construction of the cover plate will facilitate a person walking on the cover plates of multiple tray assemblies 21.

Figure 12:
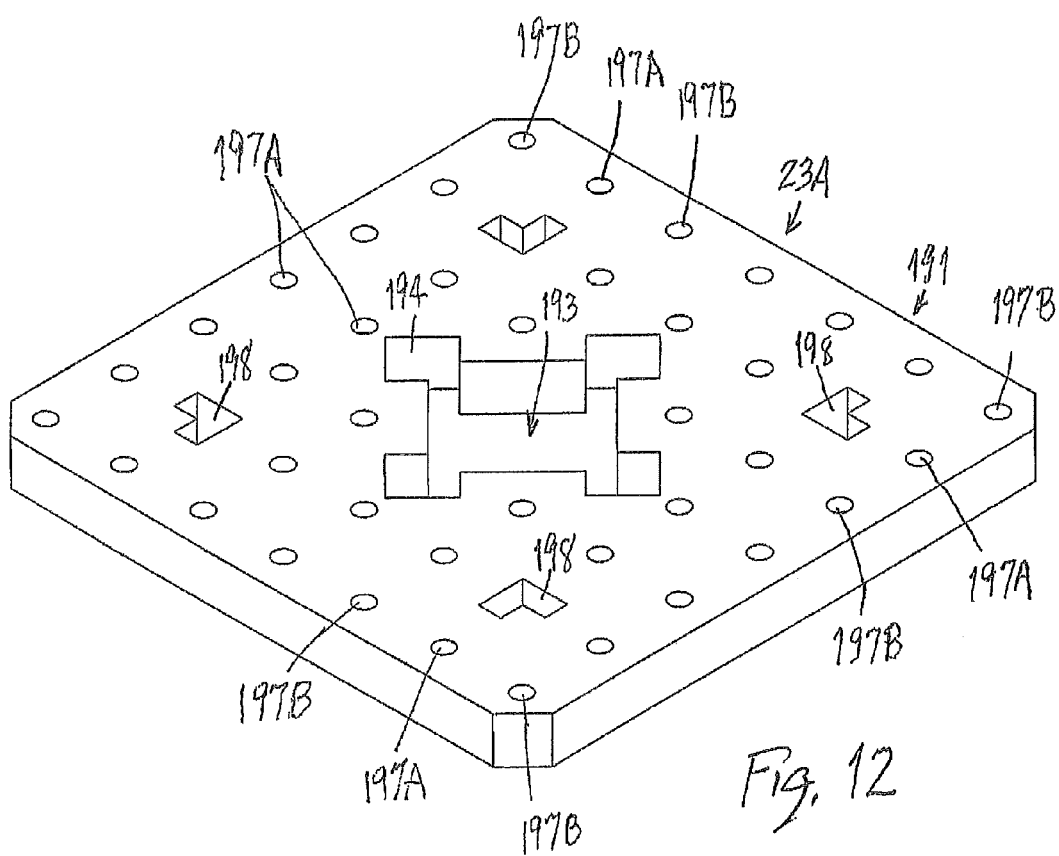
FIG. 12 is an isometric view of a modified absorbing layer.

In some situations, and to reduce the expense of making the absorbing layer 23, it may be desirable to use a modified absorbing layer, such as the absorbing layer 23A illustrated in FIG. 12, namely, an absorbing layer 23A without columns protruding downwardly from the underside of the layer. In this particular embodiment, the absorbing layer would be identical to the construction of the top layer 91 in FIG. 8 and accordingly, the same reference numbers used in describing FIG. 8 above have been used but with the prefix "1" having been added thereto. Since the absorbing layer 23A does not have columns, the holes 197A and 197B are all identical to each other. Thus, a further description of this embodiment is deemed unnecessary.

Figure 13:
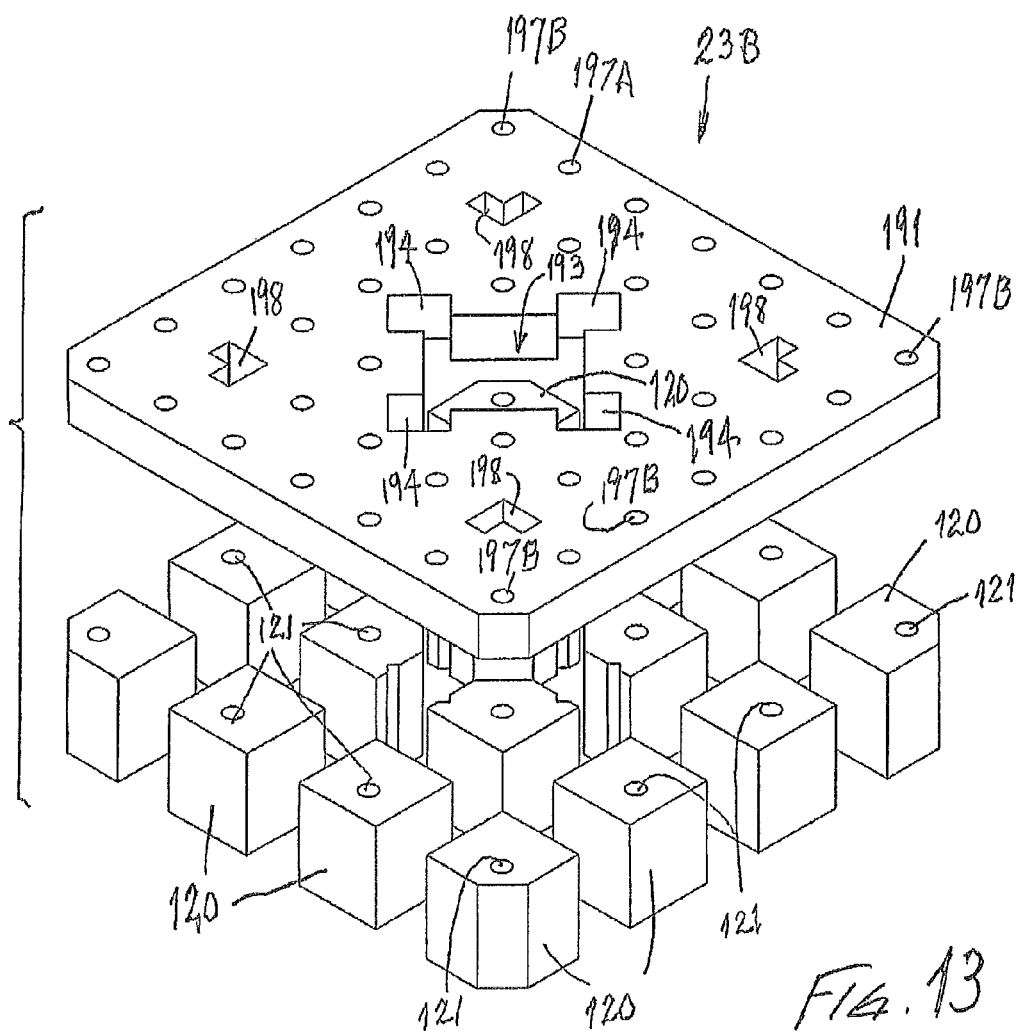
FIG. 13 is an isometric view of a further modified absorbing layer configuration.

In some still further situations, it may be desirable to use a further modified absorbing layer, such as the absorbing layer 23B is illustrated in FIG. 13, namely, a two part absorbing layer comprised of the top layer 191 identical to the top layer 91 illustrated in FIG. 12 and separate individual columns 120. The columns 120 each have a top to bottom extending hole 121 therethrough. The individual columns 120 are configured to be received in the pockets 46 in the bottom wall 32 of the container 22 and the top layer 191 rests on the top surfaces 41, 41A, 41B and the tops of the columns 120. The holes 197A in the top layer 191 are configured to be aligned with the holes 121 in the columns 120 when the absorbing layer 23B is assembled into the container 22.

A plastic or other suitable material wind deflector 130 (FIG. 15) is configured to attach to the outside perimeter of a tray assembly 21 so as to prevent high winds from penetrating under the containers 22 bottom side creating undesirable wind lift between the containers and the roof surface RS. In this particular embodiment, the wind deflector 130 has a generally l-shape having a horizontal leg 131 that extends between the peripherally situated protective pads 52 and the slip sheet 51 lining the roof surface RS until the upstanding wall 132 on the upper side of the leg 131 engages the sidewall 32 of the container 22. The wind deflector 130 also has a generally vertically inclined leg 133 integral with the horizontal leg 131 which terminates at an upper edge 134 that conforms in shape to the peripheral edge of the cover plate 25. An outwardly opening notch 136 is provided adjacent the upper edge 134. The wind deflector is configured to connect to the container 22 adjacent to the upper edge thereof and the upper edge of the rim 34 and an opening 30 (FIGS. 2 and 3) so as to accommodate the insertion of one leg of a spring clip 81 through the opening 30 while the distal end 84 the other leg of the spring clip 81 is received in the notch 136 to hold the clip in place. If desired, the wind deflector may also be secured to the upper edge of the sidewall 32 by one or more screws (not shown).

Operation

While the operation of the rain water collection system 20 will be understood by those skilled in the art, the below set forth description of the operation is being provided only for convenience in understanding.

When the components described above have been assembled to create our rain water collection system 20 as illustrated in FIGS. 6 and 14, for example, rain water will enter the tray assembly 21 through the cover plate 25 and the spacing provided between the members 106 and 108 thereon. Rain landing on the members 106 and 108 will be directed to the top of the absorbing layer 23 by the inclined surfaces at 111. The rain water will be absorbed by the absorbing layer 23. Assuming that the amount of rain water collected in the absorbing layer 23 from a rain storm does not exceed the water retention capacity thereof, dry air will move into the internal region 33 of the container 22, through the holes 97A and 97B in the absorbing layer as well as throughout the container 22 to facilitate evaporation of water from the absorbing layer and eventually dry it without any rain water having left the container via the drain opening 53.

If, on the other hand, the amount of rain water to enter the tray assembly 21 exceeds the water retention capacity of the absorbing layer 23, excess water will enter the interior region 33 of the container located immediately below the top layer 91 of the absorbing layer 23. If the amount of the excess water is enough to fill the container 22 to a level above the upper rim of the flange 54 surrounding the drain opening 53, this water will exit the container via the drain opening and water will flow eventually to the roof drains on the building roof. The size of the drain opening 53 will determine the rate at which this water will exit the container 22. Once the level of the water in the container 22 is lowered to the level of the upper rim of the flange surrounding the drain opening, water will have previously soaked into the columns 96 and 96A and be wicked upwardly into the top layer 91 of the absorbing layer 23. Thus, the term "wicking columns" will be used to refer to the columns 96 and 96A. After the rain storm has ended, dry air will enter the container through the cover plate 25 and the openings 76 and 76A and move about the periphery of the absorbing layer 23, particularly the top layer 91 and the wicking columns 96 and 96A, to facilitate the evaporation of water therefrom. Water soaked into the wicking columns will continue to be wicked up into the top layer 91 and this process will continue until all wetness in the absorbing layer 23 has dried. In this situation, only a minimal amount of rain water will have exited the container 22 through the drain opening 53.

If, on the other hand, a torrential amount of rain water is permitted to enter the container 22 to saturate the absorbing layer 23, the excess rain water will exit the absorbing layer 23 to enter the interior region 33 of the container 22 directly below the top layer 91 of the absorbing layer 23. The lower edge of the openings 41, 41A, 41B and 77 will facilitate the overflow of water from the container 22 onto the roof surface of the building. Oftentimes, the delay in rain water runoff exiting a building roof will provide sufficient time for the local storm water management systems to receive the roof runoff water without resulting in localized flooding conditions.

Although particular preferred embodiments of the invention have been disclosed in detail for illustrative purposes, it will be recognized that variations or modifications of the disclosed apparatus lie within the scope of the present invention.

We claim:

1. A rain water collection system for a blue roof system, the water collection system comprising:
   a tray assembly comprising a container having sidewalls, a bottom wall and an open top that defines an interior region of said container, said interior region having a plurality of upstanding columns projecting upwardly from said bottom wall, a first set of upstanding columns of said plurality of upstanding columns projecting upwardly from said bottom wall to a first elevated position within said interior region so as to promote the free movement of air and water within said interior region while upwardly facing surfaces on each of said first set of upstanding columns provides a set of coplanar first support surfaces spaced said first elevated position above a plane of said bottom wall;
   a water absorbing layer located in said interior region, said water absorbing layer being supported on said first support surfaces so that an upwardly facing surface of said water absorbing layer is exposed to the environment, said spacing of said first support surfaces above the plane of said bottom wall facilitating the provision of a water collecting space between an underside of said water absorbing layer and said bottom wall to facilitate the flow of excess water that exceeds the water absorbing capacity of said water absorbing layer into said water collecting space of said interior region that is between said underside of said water absorbing layer and said bottom wall;
   said plural sidewalls of said container having plural openings therethrough to facilitate the passage of air into and around said plurality of said first set of upstanding columns, said water absorbing layer, and said water collecting space to enhance the evaporation of water from said water absorbing layer and said water collecting space; and wherein said tray assembly includes a cover plate configured to mount across the open top of said container, said plurality of upstanding columns including a second set of upstanding columns projecting upwardly from said bottom wall to a second elevated position with said interior region a distance that is greater than said first elevated position to define a set of coplanar second support surfaces each configured to provide a load bearing support for said cover plate.

2. The rain water collection system for a blue roof system according to claim 1, wherein selected ones of said second set of upstanding columns are integral with selected ones of said first set of upstanding columns to enhance the support capacity of said selected ones of said second set of upstanding columns that support said cover plate.

3. The rain water collection system for a blue roof system according to claim 1, wherein said water absorbing layer includes at least one water permeable wicking column located in said water collecting space and extending between said bottom wall and said underside of said water absorbing layer and configured so that any water located in said water collecting space will be wicked up into said water absorbing layer to facilitate the exposure of the water in said wicking column and water absorbing layer to the environment to facilitate evaporation of said water therefrom during periods when natural or manmade conditions permit; and wherein a plurality of depressions are provided in said bottom wall and are configured to receive therein a bottom end of said at least one water permeable wicking column.

4. The rain water collection system for a blue roof system according to claim 3, wherein said depressions are each further configured to provide a reservoir into which is collected water in said water collecting space, said depressions each having a bottom wall lower in elevation than said bottom wall of said container, said bottom wall of said container having a drain opening surrounded by an upstanding wall of a selected height that is below said openings through said sidewalls so as to allow collected water in said water collecting space to flow freely from one reservoir to another without interfering with the internal air flow within and throughout said tray assembly.

5. The rain water collection system for a blue roof system according to claim 4, wherein said drain opening is located centrally of said water collecting space.

6. The rain water collection system for a blue roof system according to claim 3, wherein said selected ones of said plurality of upstanding columns are provided with an internal passageway and a passageway adjacent an upper end thereof, wherein said bottom wall of said depressions provides an air space between a building roof and an underside of said container to facilitate a passage of air up through said internal passageway in said upstanding columns and said passageway adjacent the upper end of the upstanding columns and circulate into and around said water absorbing layer and said water collecting space to enhance the evaporation of water from said water absorbing layer and water collecting space.

7. The rain water collection system for a blue roof system according to claim 6, wherein plural said depressions are formed in said bottom wall of said container and project downward toward the building roof to form feet so as to contact the building roof and create a gap between the bottom surface of said container bottom wall and the building roof to provide for the movement of water or other fluids along the building roof toward a building roof drain.

8. The rain water collection system for a blue roof system according to claim 7, wherein said depressions formed in said bottom wall of said container each having on a bottom facing surface thereof an insulating slip sheet material oriented between said building roof and said bottom facing surface of said depressions to separate said container from a roof membrane protecting the building roof and protecting the roof membrane from wear and damage caused by said container resting thereon.

9. The rain water collection system for blue roof system according to claim 3, wherein plural wicking columns are provided and each of said plural wicking columns and said water absorbing layer are integrally connected, a lower end of each said wicking column being received in a respective depression.

10. The rain water collection system for a blue roof system according to claim 1, wherein said openings in said sidewalls of said container are each configured to facilitate the release of water that exceeds a collecting capacity of said water collecting space.

11. The rain water collection system for a blue roof system according to claim 1, wherein said bottom wall of said container includes at least one ballast receiving pocket configured to receive therein a weighted ballast member.

12. The rain water collection system for a blue roof system according to claim 11, wherein said bottom wall of said ballast receiving pocket includes plural support ribs and on which the weighted ballast member is elevated from a bottom wall of said pocket so that a clearance space exists between an underside of the weighted ballast member and said bottom wall of said pocket thereby enlarging the containers water collection capacity of said water collecting space.

13. The rain water collection system for a blue roof system according to claim 1, wherein said cover plate includes a grid-like configuration mounted over said open top and secured to a peripheral rim structure on said sidewalls of said container and on said second support surfaces on said second set of columns to provide a surface for an individual to walk upon.

14. The rain water collection system for a blue roof system according to claim 13, wherein edges of said grid-like cover plate includes air deflection surfaces for directing moving air in the environment into said interior region and into engagement with, through and around said water absorbing layer to enhance evaporation of water therefrom.

15. The rain water collection system for a blue roof system according to claim 13, wherein edges of said grid-like cover plate includes water deflection surfaces for directing rain water in the environment into said interior region and into engagement with and through said water absorbing layer and thence into said water collecting space of said interior region when the volume of rain water exceeds the water absorbing capacity of said water absorbing layer.

16. The rain water collection system for a blue roof system according to claim 1, wherein said water absorbing layer is made of a sponge-like material or other water absorptive material configured to retain a limited quantity of water while simultaneously allowing water exceeding the aforesaid limited quantity to exit said sponge-like material and be collected in said water collecting space.

17. The rain water collection system for a blue roof system according to claim 16, wherein plural holes are provided in said sponge-like material to facilitate the passage of drying air therethrough.

18. The rain water collection system for a blue roof system according to claim 1, wherein a plurality of adjacent containers each with a cover plate are provided, wherein each said cover plate has one or more openings adjacent a perimeter thereof and a lip, said one or more openings being configured to receive a generally U-shaped or V-shaped spring clip, adjacent openings on adjacent cover plates being oriented adjacent to each other during installation so that legs of the spring clip will be received in the openings and straddle said lips in adjacent cover plates to lock the cover plates together while simultaneously not limiting the containers installation orientation while loosely and securely connecting side-by-side containers and allowing said containers to move in relation to another so as to accommodate varying roof deck undulations and elevations.

19. The rain water collection system for a blue roof system according to claim 18, wherein a perimeter of an assembly of plural adjacent containers includes a wind deflector connected to the outside facing sidewalls of the assembly so as to prevent high winds from penetrating under said containers.

* * * * *